(12) United States Patent
Furukawa et al.

(10) Patent No.: US 9,016,845 B2
(45) Date of Patent: Apr. 28, 2015

(54) INK FOR INK-JET RECORDING APPARATUS AND METHOD FOR FORMING IMAGE

(71) Applicant: Kyocera Document Solutions Inc., Osaka (JP)

(72) Inventors: Noriaki Furukawa, Osaka (JP); Noriaki Ozawa, Osaka (JP); Yasuko Takaori, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 129 days.

(21) Appl. No.: 13/676,971

(22) Filed: Nov. 14, 2012

(65) Prior Publication Data

US 2013/0127953 A1  May 23, 2013

(30) Foreign Application Priority Data

Nov. 17, 2011 (JP) ................................. 2011-252108

(51) Int. Cl.
| | |
|---|---|
| *B41J 2/045* | (2006.01) |
| *C09D 11/107* | (2014.01) |
| *B41J 2/21* | (2006.01) |
| *C09D 11/322* | (2014.01) |
| *C09D 11/38* | (2014.01) |

(52) U.S. Cl.
CPC ............... *C09D 11/107* (2013.01); *B41J 2/045* (2013.01); *B41J 2/04581* (2013.01); *B41J 2/2107* (2013.01); *C09D 11/322* (2013.01); *C09D 11/38* (2013.01)

(58) Field of Classification Search
CPC ............ B41J 2/01; B41J 2/2107; B41J 2/045; B41J 2/14201; B41J 2/04581; C09D 11/00; C09D 11/30; C09D 11/322; C09D 11/38; C09D 11/107
USPC ........ 347/68, 95–100, 9, 13, 20, 42; 523/160, 523/161; 106/31.13, 31.6
See application file for complete search history.

(56) References Cited

U.S. PATENT DOCUMENTS

| | | |
|---|---|---|
| 5,772,746 A | 6/1998 | Sawada et al. |
| 2004/0182282 A1 | 9/2004 | Yamazaki et al. |
| 2007/0263054 A1 | 11/2007 | Yatake et al. |
| 2008/0068412 A1 * | 3/2008 | Kikuchi et al. ................. 347/12 |
| 2009/0035468 A1 | 2/2009 | Matsuyama et al. |
| 2010/0040782 A1 * | 2/2010 | Arai et al. ..................... 427/256 |
| 2010/0222472 A1 | 9/2010 | Morimoto |
| 2011/0050769 A1 * | 3/2011 | Tsukamoto ..................... 347/10 |
| 2013/0027485 A1 | 1/2013 | Ozawa |

FOREIGN PATENT DOCUMENTS

| | | |
|---|---|---|
| EP | 0277703 A1 * | 8/1988 |
| JP | 05-339529 | 12/1993 |
| JP | 10-279869 | 10/1998 |

(Continued)

*Primary Examiner* — Matthew Luu
*Assistant Examiner* — Rut Patel
(74) *Attorney, Agent, or Firm* — K&L Gates LLP

(57) ABSTRACT

An ink for an ink-jet recording apparatus contains water, a pigment, a resin, 1,3-propanediol, and an organic solvent. The resin has a weight-average molecular weight of 30,000 to 150,000. The content of the resin is 1.5% to 6.0% by mass with respect to the mass of the ink. The total content (P+Q) of the content of the glycerol (P) and the content of the 1,3-propanediol (Q) in the ink is 15% to 40% by mass with respect to the mass of the ink. The mass ratio (P/Q) is 0.25 to 1.00.

9 Claims, 4 Drawing Sheets

(56) References Cited

FOREIGN PATENT DOCUMENTS

| | | |
|---|---|---|
| JP | 2003-213179 | 7/2003 |
| JP | 2004-035683 | 2/2004 |
| JP | 2004-195706 | 7/2004 |
| JP | 2005-082607 | 3/2005 |
| JP | 2009-067942 | 4/2009 |
| JP | 2009-144006 | 7/2009 |
| JP | 2010-000766 | 1/2010 |
| JP | 2010-084086 | 4/2010 |
| JP | 2010-106155 | 5/2010 |
| JP | 2010-106157 | 5/2010 |
| JP | 2012-046639 | 3/2012 |

* cited by examiner

INK FOR INK-JET RECORDING APPARATUS AND METHOD FOR FORMING IMAGE

INCORPORATION BY REFERENCE

This application is based upon, and claims the benefit of priority from, corresponding Japanese Patent Application No. 2011-252108, filed Nov. 17, 2011, the entire contents of which are incorporated herein by reference.

FIELD

The present disclosure relates to an ink for an ink jet recording apparatus and methods for forming an image.

BACKGROUND

Recently, with the rapid progress in recording technologies, it has been possible to obtain high-definition image quality substantially equal to that of silver halide photography. Accordingly, ink-jet recording apparatuses, that form images by an ink-jet recording system, have been widely used as image forming apparatuses.

For such ink-jet recording apparatuses, improvement in image formation speed has been strongly desired while maintaining image quality. To increase the image formation speed, it is effective to use an ink-jet recording apparatus using a line-head recording system (hereinafter, also referred to as a "line-head-type ink-jet recording apparatus"). When an image is formed at high speed with line-head-type ink-jet recording apparatus, however, a recording medium, such as paper, is conveyed by an output roller pair to the outside before an ink permeates into the recording medium. In this case, the ink may adhere to the output roller (offset). This is liable to cause an image defect. To reduce the occurrence of offset, it is conceivable that the amount of the ink ejected is reduced and that the permeability of the ink to the recording medium and drying properties of the ink are enhanced. In the former situation, it may be difficult to form an image having a desired image density. In the latter situation, when an image is formed after the ink has not been ejected from a recording head for some time, the failure to eject an ink may be caused by, for example, a change in the viscosity of the ink.

In light of the foregoing, an ink for use in ink jet recording is reported as an ink capable of inhibiting the clogging of the recording head and failure to eject even if the solidification of the ink, which may cause the failure to eject ink droplets from a recording head, occurs. The ink contains a pigment, water, and an water-soluble organic solvent that contains polyethylene glycol and/or diglycerol, and a content of polyethylene glycol and/or diglycerol being 10% by weight or more.

In the ink for ink-jet recording, however, the polyethylene glycol and diglycerol contained in the ink each has a high viscosity as a solvent itself. Thus, a change in the viscosity of the ink due to the evaporation of water is liable to occur. In the case where such an ink is used for, in particular, a line-head-type ink-jet recording apparatus including a plurality of recording heads, a significant increase in the viscosity of the ink due to the evaporation of water is observed.

SUMMARY

According to an embodiment of the present disclosure, an ink, for an ink-jet recording apparatus, is provided that contains water, a pigment, a resin, a humectant, and an organic solvent. The resin has a weight-average molecular weight of 30,000 to 150,000. The content of the resin is 1.5% to 6.0% by mass with respect to the mass of the ink. The humectant contains glycerol and 1,3-propanediol. The total content (P+Q) of the content of the glycerol (P) and the content of the 1,3-propanediol (Q) in the ink is 15% to 40% by mass with respect to the mass of the ink. The mass ratio (P/Q) is 0.25 to 1.00.

According to another embodiment of the present disclosure, a method for forming an image with an ink-jet recording apparatus is provided that includes ejecting an ink to a recording medium to form an image. The ink contains water, a pigment, a resin, a humectant, and an organic solvent. The resin has a weight-average molecular weight of 30,000 to 150,000. The content of the resin is 1.5% to 6.0% by mass with respect to the mass of the ink. The humectant contains glycerol and 1,3-propanediol. The total content (P+Q) of the content of the glycerol (P) and the content of the 1,3-propanediol (Q) in the ink is 15% to 40% by mass with respect to the mass of the ink. The mass ratio (P/Q) is 0.25 to 1.00.

Additional features and advantages are described herein, and will be apparent from the following Detailed Description and the figures.

DETAILED DESCRIPTION

Figure 1:
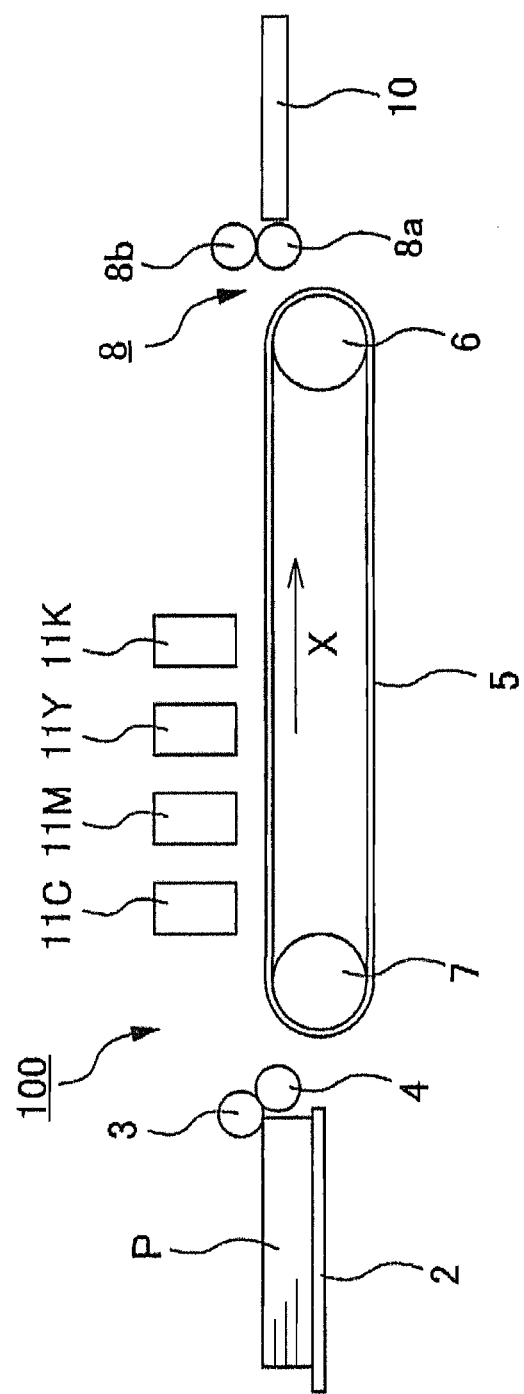
FIG. 1 is a cross-sectional view of a structure of a line-head-type ink-jet recording apparatus.

While embodiments of the present disclosure will be described in detail below, the present disclosure is not limited to the following embodiments. Appropriate changes may be made without departing from the object of the present disclosure. While descriptions may not be redundantly repeated, the gist of the disclosure is not limited.

In an embodiment the disclosure provides an ink for an ink-jet recording apparatus, the ink containing water, a pigment, a resin, a humectant, and an organic solvent. The resin has a weight-average molecular weight of 30,000 to 150,000. The content of the resin is 1.5% to 6.0% by mass with respect to the mass of the ink. The humectant contains glycerol and 1,3-propanediol. The total content (P+Q) of the content of the glycerol (P) and the content of the 1,3-propanediol (Q) in the ink is 15% to 40% by mass with respect to the mass of the ink. The mass ratio (P/Q) is 0.25 to 1.00.

The ink for an ink jet recording apparatus according to an embodiment (hereinafter, also referred to simply as an "ink") may contain a dissolution stabilizer to stabilize the dissolved state of the components in the ink in addition to the water, the pigment, the resin, the humectant, and the organic solvent, as needed. The ink can contain the pigment and the resin in the form of a pigment dispersion. The water, the pigment dispersion, which contains the pigment and the resin, the humectant, the organic solvent, and the dissolution stabilizer, which are essentially or optionally contained in the ink for an ink-jet recording apparatus, a method for producing an ink for ink-jet recording apparatus, and a method for forming an image will be described in sequence below.

Water

The ink for an ink-jet recording apparatus is an aqueous ink and essentially contains water. The water contained in the ink is not particularly limited. As the water, a water which has desired purity may be appropriately selected from waters that have been used for the production of aqueous inks. The content of the water in the ink for an ink-jet recording apparatus is not particularly limited. The content of the water is appropriately set, depending on proportions of other components described below. Typically, the content of the water in the ink is preferably 20% to 70% by mass and more preferably 25% to 60% by mass with respect to the total mass of the ink.

Pigment Dispersion

The ink for an ink-jet recording apparatus contains the pigment dispersion containing the pigment, which serves as a colorant, and the resin. The pigment that may be contained in the pigment dispersion is not particularly limited. As the pigment, the pigment may be selected from pigments that have been used as colorants for use in inks for ink-jet recording apparatuses. Specific examples of a preferred pigment include yellow pigments, such as C.I. Pigment Yellow 74, 93, 95, 109, 110, 120, 128, 138, 139, 151, 154, 155, 173, 180, 185, and 193; orange pigments, such as C.I. Pigment Orange 34, 36, 43, 61, 63, and 71; red pigments, such as C.I. Pigment Red 122 and 202; blue pigments, such as C.I. Pigment Blue 15; violet pigments, such as C.I. Pigment Violet, 19, 23, and 33; and black pigments, such as C.I. Pigment Black 7.

A method for producing the pigment dispersion containing the pigment and the resin is not particularly limited. The method may be appropriately selected from known methods. An example of a preferred method is a method in which the pigment and the resin are kneaded with a wet disperser using a medium, for example, NANO GRAIN MILL (manufactured by Asada Iron Works Co., Ltd.), MSC MILL (manufactured by Mitsui Mining Co., Ltd.), or DYNO-MILL (manufactured by Shinmaru Enterprises Corporation), in a suitable liquid medium, such as water, to form the pigment dispersion. In treatment with the wet disperser using the medium, beads having small particle diameter are used. The particle diameter of the beads is not particularly limited and is typically 0.5 mm to 1.0 mm. The material of the beads is not particularly limited. A hard material, such as zirconia beads, can be used.

The amount of the liquid medium used in the production of the pigment dispersion is not particularly limited as long as the pigment and the resin can be satisfactorily kneaded. Typically, the mass of the liquid medium used is preferably 1 to 10 times and more preferably 2 to 8 times the total mass of the pigment and the resin.

Pigment

The pigment in the pigment dispersion preferably has a volume-average particle diameter of 30 nm to 200 nm and more preferably 50 nm to 130 nm in view of the color density, hue, or stability of the ink. The volume-average particle diameter of the pigment may be adjusted by adjusting the particle diameter of the beads used for the kneading of the pigment and the resin and the treatment time. An excessively small volume-average particle diameter of the pigment may result in a lower image density of an image to be formed than a desired value. An excessively large volume-average particle diameter of the pigment may result in the clogging of the nozzle that ejects the ink and a degradation of ejection properties. For example, the volume-average particle diameter of the pigment may be measured with a dynamic light scattering particle size distribution analyzer (manufactured by Sysmex Corp.) using a sample prepared by diluting the pigment dispersion 300 times with deionized water.

Resin

The resin in the pigment dispersion is not particularly limited. The resin may be appropriately selected from various resins that have been used for the production of the pigment dispersion. Specific examples of a preferred resin include styrene-acrylic acid-alkyl acrylate copolymers, styrene-methacrylic acid-alkyl methacrylate-alkyl acrylate copolymers, styrene-acrylic acid copolymers, styrene-maleic acid copolymers, styrene-maleic acid-alkyl acrylate copolymers, styrene-methacrylic acid copolymers, styrene-alkyl methacrylate copolymers, styrene-monoalkyl maleate copolymers, vinylnaphthalene-acrylic acid copolymers, and vinylnaphthalene-maleic acid copolymers. Among these resins, preferred are styrene-acrylic resins containing styrene-derived units and units derived from acrylic acid, methacrylic acid, acrylates, and methacrylates, such as styrene-acrylic acid-alkyl acrylate copolymers, styrene-methacrylic acid-alkyl methacrylate-alkyl acrylate copolymers, styrene-acrylic acid copolymers, styrene-maleic acid-alkyl acrylate copolymers, styrene-methacrylic acid copolymers, and styrene-alkyl methacrylate copolymers, because these resins are easily prepared and are very effective in dispersing the pigment.

The resin in the pigment dispersion has a molecular weight of 30,000 to 150,000. The molecular weight of the resin is measured as a weight-average molecular weight (Mw) by, for example, gel permeation chromatography. The preferred molecular weight of the resin may be achieved by a known method in which, for example, the amount of a polymerization initiator used, the polymerization temperature, the polymerization time, or the like is adjusted when the resin is prepared.

In the case where the resin in the pigment dispersion has a molecular weight of less than 30,000, when an image is formed on a recording medium, an image having a desired image density is not easily produced. Furthermore, when the ink is exposed to a high-temperature environment for prolonged periods of time, a change in the viscosity of the ink is not easily reduced. In the case where the resin in the pigment dispersion has a molecular weight of more than 150,000, when the ink is not ejected from a recording head for some time, the solvent is easily evaporated. The evaporation of the solvent is liable to lead to an increase in the viscosity of the ink. Thus, when an image is formed, a failure to eject the ink is liable to occur.

The amount of resin used for the preparation of the pigment dispersion is 1.5% to 6.0% by mass with respect to the mass of the ink. In the case where the amount of the resin used is less than 1.5% by mass with respect to the mass of the ink, each component in the pigment dispersion is less likely to be stably dispersed in the pigment dispersion. Thus, when the ink is exposed to a high-temperature environment for prolonged periods of time, a change in the viscosity of the ink is not easily reduced. In the case where the amount of the ink used is more than 6.0% by mass with respect to the mass of the ink, a large amount of solid matter contained in the ink can easily cause an increase in the viscosity of the ink. Thus, when an image is formed after the ink is not ejected from the recording head for some time, a failure to eject the ink is liable to occur.

The amount of the pigment in the pigment dispersion is not particularly limited. Typically, the amount of the pigment in the pigment dispersion is preferably 2.0% to 15.0% by mass and more preferably 4.0% to 12.0% by mass with respect to the total mass of the ink. The use of an excessively small amount of the pigment is less likely to provide an image having a desired image density. Use of an excessively large amount of the pigment, a reduction in the flowability of the ink is less likely to form a satisfactory image. Furthermore, a reduction in the permeability of the ink to a recording medium may be liable to lead to the occurrence of the offset of a formed image.

Humectant

The humectant used for the ink of the present disclosure contains glycerol and 1,3-propanediol. The use of glycerol and 1,3-propanediol as the humectant provides an ink having satisfactory moisture retention properties and reduces the evaporation of liquid components from the ink to stabilize the viscosity of the ink. In the case where an image is formed after the ink is not ejected from the recording head for some time, 1,3-propanediol is very effective in reducing the failure to eject the ink, compared with propylene glycol (1,2-propanediol). Furthermore, using 1,3-propanediol as the humectant can reduce the viscosity of the ink, compared with alkanediols each having 4 or more carbon atoms in its molecular chain. Thus, in the case where an image is formed after the ink is not ejected from the recording head for some time, it is easy to reduce the failure to eject the ink. Moreover, 1,3-propanediol has a lower effect on the environment and the human body than alkanediols each having 2 or less carbon atoms in its molecular chain.

Relationship Between Content of Glycerol (P) and Content of 1,3-Propanediol (Q)

The total content (P+Q) of the content of the glycerol (P) and the content 1,3-propanediol (Q) in the ink is 15% to 40% by mass with respect to the mass of the ink, and the mass ratio (P/Q) is 0.25 to 1.00.

In the case where the total content (P+Q) is less than 15% by mass, when the ink is not ejected from the recording head for some time, the solvent is easily evaporated from the ink because of low moisture retention properties of the ink. The evaporation of the solvent is liable to lead to an increase in the viscosity of the ink. Thus, when an image is formed after the ink is not ejected from the recording head for some time, a failure to eject the ink is liable to occur. Each component in the ink is less likely to be stably dispersed in the ink. When the ink is exposed to a high-temperature environment for prolonged periods of time, the viscosity of the ink is liable to increase. In the case where the total content (P+Q) is more than 40% by mass, when the solvent is evaporated from the ink, the viscosity of the ink is liable to increase, compared with the case where the total content (P+Q) is low. Thus, when an image is formed after the ink is not ejected from the recording head for some time, a failure to eject the ink is liable to occur.

Here, the ink contains glycerol, thus providing moisture retention properties to the ink and increasing the viscosity of the ink. In the case where the mass ratio (P/Q) is more than 1.00, a relatively large amount of glycerol is used in the ink, thereby easily increasing the viscosity of the ink. When an image is formed after the ink is not ejected from the recording head for some time, the failure to eject the ink is liable to occur. In the case where the mass ratio (P/Q) is less than 0.25, the content of the glycerol is relatively low, thereby resulting in low moisture retention properties of the ink. Thus, when the ink is not ejected from the recording head for some time, the solvent in the ink is easily evaporated.

The ink may contain a humectant other than glycerol or 1,3-propanediol as long as the content of the glycerol (P) and the content of the 1,3-propanediol (Q) in the ink, glycerol and 1,3-propanediol serving as the humectant, have the foregoing relationship. Specific examples of the humectant other than glycerol or 1,3-propanediol include polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodiglycol, 1,3-butanediol, and 1,5-pentanediol. These humectants other than glycerol or 1,3-propanediol may be used in combination of two or more. In the case where the ink contains the humectant other than glycerol or 1,3-propanediol, the content of the humectant other than glycerol or 1,3-propanediol in the ink is preferably 5% to 60% by mass and more preferably 10% to 50% by mass with respect to the total mass of the ink.

Organic Solvent

The ink contains an organic solvent in order to, for example, promote the permeation of the ink to a recording medium. Specific examples thereof include alkyleneglycol monoalkyl ethers, such as ethylene glycol monobutyl ether, triethylene glycol monomethyl ether, triethylene glycol monobutyl ether, diethylene glycol monomethyl ether, and ethylene glycol monomethyl ether; and alkanediols having 6 to 9 carbon atoms, such as 1,2-hexanediol, 1,2-octanediol, 2-ethyl-1,3-hexanediol, 2,4-diethyl-1,5-pentanediol, 2-butyl-2-ethyl-1,3-propanediol, and 1,2-hexylene glycol. These organic solvents may be used separately or in combination of two or more. The content of the organic solvent in the ink is preferably 2% to 20% by mass and more preferably 4% to 15% by mass with respect to the total mass of the ink.

The organic solvent preferably contains at least one selected from 1,2-hexanediol, 1,2-octanediol, 2-ethyl-1,3-hexanediol, 2,4-diethyl-1,5-pentanediol, and 2-butyl-2-ethyl-1,3-propanediol. These organic solvents may be used separately or in combination or two or more. The content of the organic solvent (organic solvent described above) in the ink is preferably 0.1% to 3.0% by mass and more preferably 0.2% to 2.0% by mass with respect to the total mass of the ink. Preferably, the amount of the organic solvent used is appropriately adjusted within the range described above, depending on the type of organic solvent.

In the case where the organic solvent in the ink contains at least one selected from 1,2-hexanediol, 1,2-octanediol, 2-ethyl-1,3-hexanediol, 2,4-diethyl-1,5-pentanediol, and 2-butyl-2-ethyl-1,3-propanediol, the ink permeates the recording medium rapidly and appropriately. Thus, even if a line-head-type ink-jet recording apparatus, which is liable to cause offset, is used, an image having a desired image density can be formed while contamination of the recording medium due to offset is reduced.

Dissolution Stabilizer

The dissolution stabilizer is a component that compatibilizes components in the ink to stabilize the dissolved state of the components in the ink. Specific examples of the dissolution stabilizer include 2-pyrrolidone, N-methyl-2-pyrrolidone, and γ-butyrolactone. These dissolution stabilizers may be used in combination of two or more. In the case where the ink contains the dissolution stabilizer, the content of the dissolution stabilizer in the ink is preferably 1% to 20% by mass and more preferably 3% to 15% by mass with respect to the total mass of the ink.

Method for Producing Ink for Ink-Jet Recording Apparatus

A method for producing the ink is not particularly limited as long as the pigment dispersion in which the resin and the pigment are dispersed in a solvent, water, the humectant, and the organic solvent, which are essential components, and optionally the dissolution stabilizer and so forth can be substantially uniformly mixed together. A specific example of the method for producing the ink for an ink-jet recording apparatus is a method in which after the components for the ink are uniformly mixed with a mixer, foreign matter and coarse particles are removed with a filter having a pore size of 10 μm or less. When the ink is produced, various additives, such as the dissolution stabilizer, a surfactant, an antioxidant, a viscosity modifier, a pH modifier, a preservative, and a fungicide, which have been added to inks for ink-jet recording apparatuses, may be added, as needed.

The ink for an ink-jet recording apparatus according to an embodiment is suitably used for various ink-jet recording apparatuses because the ink reduces the failure to eject the ink after the ink is not ejected from the recording head for some time and because the ink reduces a change in the viscosity of the ink even when exposed to a high-temperature environment.

A further embodiment of the disclosure relates to a method for forming an image with the ink for an ink-jet recording apparatus according to the previous embodiment using the ink-jet recording apparatus. The recording type of the ink-jet recording apparatus used in the method for forming an image is not particularly limited. The ink-jet recording apparatus may be of a serial type in which recording is performed by allowing a recording head to scan a surface of a recording medium or a line-head type in which recording is performed with a recording head fixed to a main body of the apparatus. The recording type of the ink-jet recording apparatus used in the method for forming an image is preferably the line-head type in view of high-speed image formation.

Figure 2:
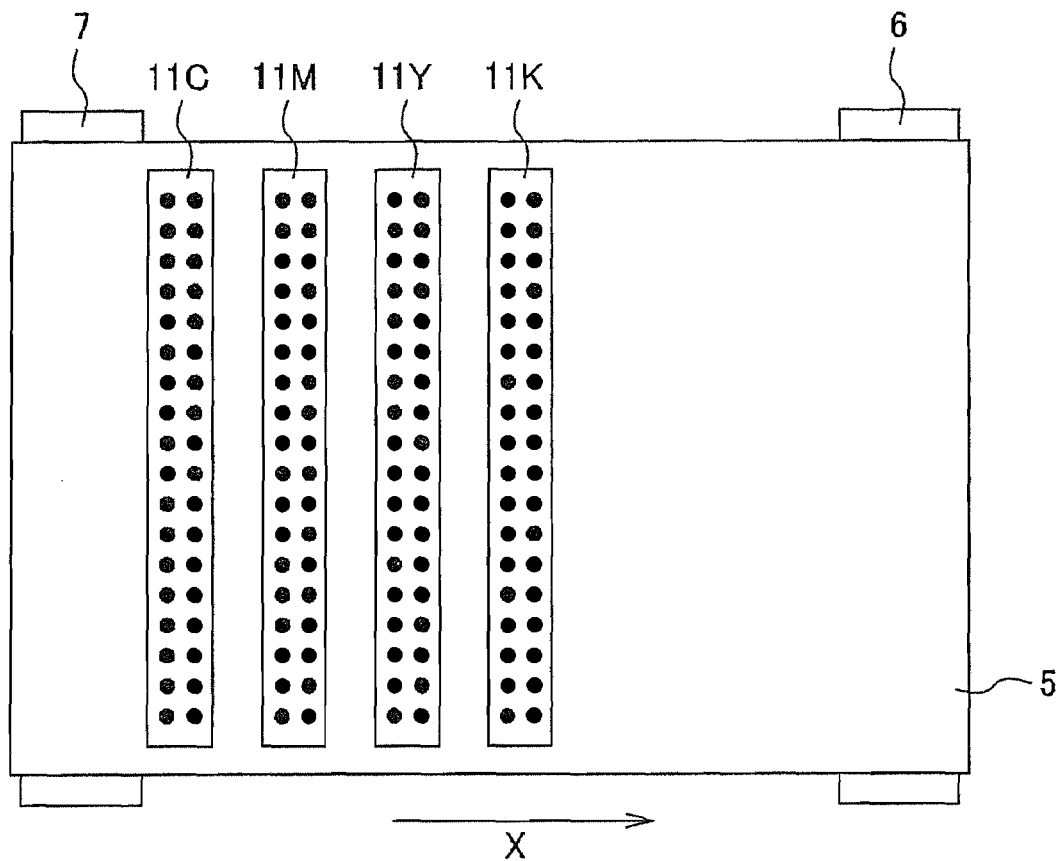
FIG. 2 is a plan view of a conveying belt of the ink-jet recording apparatus illustrated in FIG. 1 when viewed from above.

The method for forming an image with a line-head-type ink-jet recording apparatus 100 using recording paper as a recording medium will be described below with reference to the attached drawings. FIG. 1 is a cross-sectional view of the structure of the line-head-type ink-jet recording apparatus 100. FIG. 2 is a plan view of a conveying belt of the line-head-type ink-jet recording apparatus 100 illustrated in FIG. 1 when viewed from above.

As illustrated in FIG. 1, the line-head-type ink-jet recording apparatus 100 includes a feed tray 2 located on the left side of the line-head-type ink-jet recording apparatus 100, the feed tray 2 being configured to accommodate recording paper P. A feed roller 3 and a driven roller 4 are positioned at an end portion of the feed tray 2, the driven roller 4 being pressed against the feed roller 3 and rotated. The feed roller 3 feeds the recording paper P in the feed tray 2 to a conveying belt 5, described below, one by one from the top sheet of the recording paper P.

The conveying belt 5 is rotatably arranged on the downstream side of the feed roller 3 and the driven roller 4 in the sheet conveying direction (on the right side of the FIG. 1). The conveying belt 5 is stretched between a belt driving roller 6 arranged downstream side in the sheet conveying direction and a belt roller 7 which is arranged upstream side in the sheet conveying direction and which is rotated by the belt driving roller 6 via the conveying belt 5. The rotation of the belt driving roller 6 in a clockwise direction feeds the recording paper P in a direction indicated by an arrow X in FIG. 1.

Here, the belt driving roller 6 is located downstream side of the conveying belt 5 in the sheet conveying direction X. Thus, the conveying belt 5 is drawn by the belt driving roller 6 on the sheet feed side of the conveying belt 5 (on the upper side in FIG. 1). This applies tension to the conveying belt 5 on the sheet feed side, thereby enabling the stable conveyance of the recording paper P. The conveying belt 5 is formed of a dielectric resin sheet. As the conveying belt 5, a seamless belt is used.

A discharge roller 8*a* configured to be driven in the clockwise direction in FIG. 1 to eject the recording paper P, on which images have been recorded, to the outside of the main body of the apparatus, and a driven roller 8*b* which is pressed against the discharge roller 8*a* from above and which is rotated are arranged on the downstream side of the conveying belt 5 in the sheet conveying direction X. The discharge roller 8*a* and the driven roller 8*b* constitute a discharge section 8. A discharge tray 10 configured to receive the recording paper P ejected from the main body of the apparatus is arranged downstream of the discharge roller 8*a* and the driven roller 8*b*.

The driven roller 8*b* comes into direct contact with an image surface of a sheet of the recording paper P. Thus, the surface of the driven roller 8*b* is preferably composed of a water-repellent material. The use of the surface of the driven roller 8*b* composed of the water-repellent material reduces the adhesion of an ink portion, which does not permeate the recording paper P, to the driven roller 8*b* and easily reduces the occurrence of an image defect in a formed image due to offset. Preferred examples of the water-repellent material include fluorocarbon resins, such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride, and polyvinyl fluoride. As with the driven roller 8*b*, the surface of a member that comes into contact with the image surface of the recording paper P is preferably composed of the water-repellent material.

Line heads 11C, 11M, 11Y, and 11K are located above the conveying belt 5. The line heads 11C, 11M, 11Y, and 11K are supported at a height such that a predetermined gap from the upper surface of the conveying belt 5 is formed. The line heads 11C, 11M, 11Y, and 11K record an image on the recording paper P conveyed on the conveying belt 5. The line heads 11C, 11M, 11Y, and 11K are charged with colored inks of four different colors (cyan, magenta, yellow, and black), respectively. The colored inks are ejected from the respective line heads 11C to 11K, thereby forming a color image on the recording paper P.

The length of time from when ink droplets ejected from the line heads 11C to 11K land on the recording paper P until portions of the recording paper P where the ink droplets are arrive at the discharge section 8 configured to eject the recording paper P, is preferably 1 second or less in order to achieve a miniaturization of the apparatus.

The total amount of one or more colored inks ejected from the line heads 11C to 11K to the recording paper P is preferably 10.0 g/m$^2$ or less and more preferably 7.0 g/m$^2$ or less. By setting the total amount of the inks ejected to the range described above, an image is easily formed at high speed while the occurrence of an image defect in the formed image due to offset is reduced. Also in the case where inks of four or more colors land on the recording paper P, the total amount of the inks of the plural colors on the recording paper P is preferably 10.0 g/m$^2$ or less and more preferably 7.0 g/m$^2$ or less.

As illustrated in FIG. 2, each of the line heads 11C to 11K includes nozzle rows each having a plurality of nozzles extending in a direction orthogonal to the conveying direction of the recording paper P (in a vertical direction in FIG. 2). Each of the line heads 11C to 11K has a recording region with a width larger than the width of the recording paper P and is configured to record one line portion of an image at one time on the recording paper P conveyed on the conveying belt 5.

In the line-head-type ink-jet recording apparatus 100, the plural nozzles are located in the longitudinal direction of an elongated head main body having a width equal to or larger than the width dimension of the conveying belt 5, so that each of the line heads has the recording region with a width larger than the width of the recording paper P. Alternatively, for example, the following line heads may be used: short head units each having a plurality of nozzles are arranged in the width direction of the conveying belt 5 in such a manner that an image can be recorded across the full width of the recording paper P.

Examples of a method for ejecting inks from the line heads 11C to 11K include a piezoelectric method in which ink droplets are ejected using a pressure, which is created by piezoelectric elements (not illustrated), in liquid chambers of the line heads 11C to 11K; and a thermal ink-jet method in which an ink is ejected by generating bubbles with a heating element to apply a pressure to the ink. Various methods may be used. The method for ejecting the inks is preferably a piezoelectric method in which ink droplets are ejected using a pressure created in liquid chambers by controlling voltages applied to piezoelectric elements because the amounts ejected are easily controlled.

In the line-head ink-jet recording apparatus 100 used in the method for forming an image of the present disclosure, meniscus oscillations are preferably performed in which a plurality of oscillations of menisci of the inks at orifices of the plural nozzles of the line heads 11C to 11K are successively performed using pressure, which is created by the piezoelectric elements, in the liquid chambers of the line heads 11C to 11K to the extent that the inks are not ejected. In the meniscus oscillations, the number of oscillations of each of the inks is preferably 100 or more and more preferably 300 or more. In the case where the meniscus oscillation in which plural oscillations of the menisci of the inks are successively performed, the inks in and in the vicinity of the nozzles of the line heads 11C to 11K are stirred. This reduces an increase in the viscosity of the inks in and in the vicinity of the nozzles, thereby reducing the failure to eject the inks when an image is formed.

The meniscus oscillations are preferably performed when an image is not formed by ejecting the inks from the line heads 11C to 11K (hereinafter, referred to as an "image non-forming period"). The meniscus oscillations are preferably performed at intervals of 0.3 seconds or more.

Figure 3:
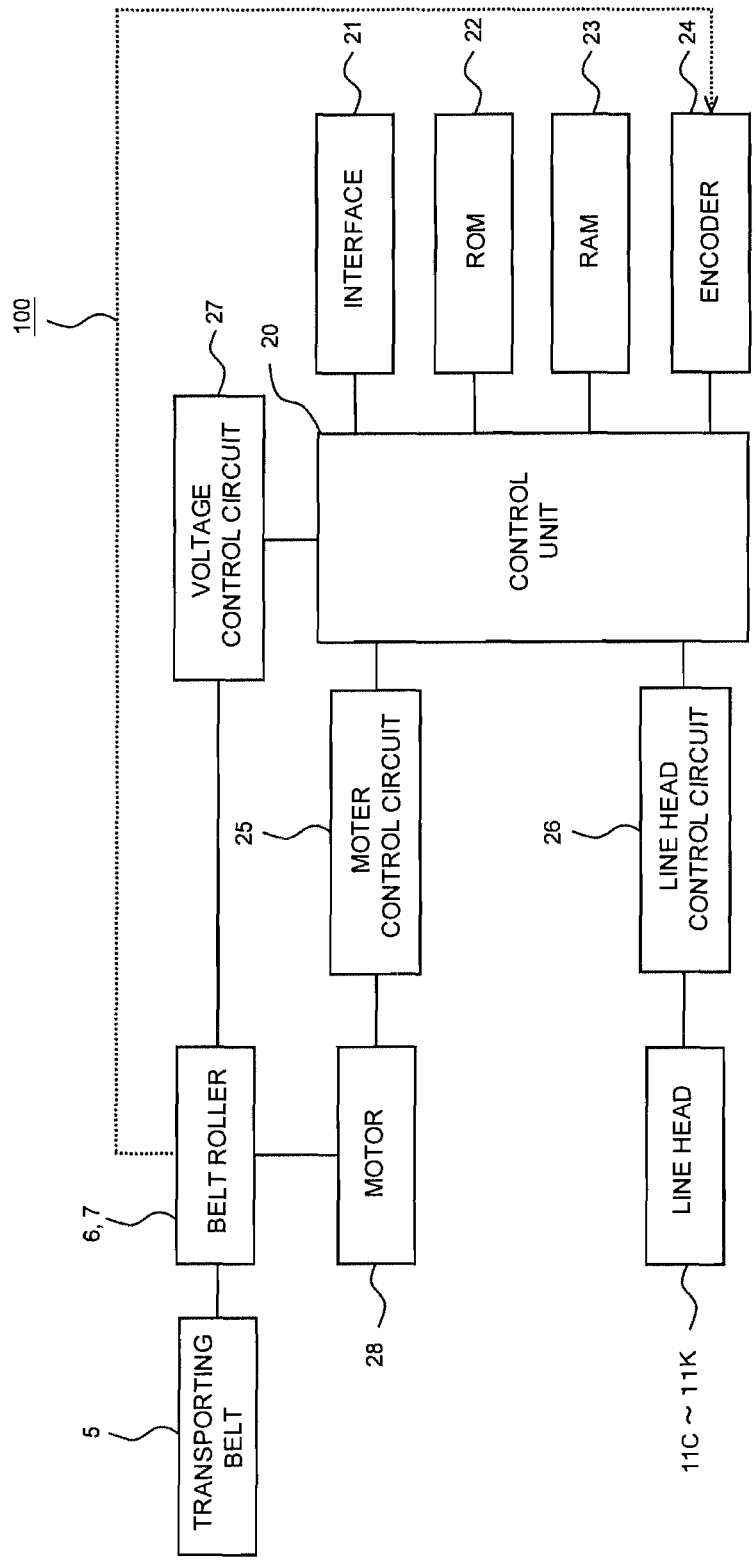
FIG. 3 is a block diagram illustrating a configuration of the line-head-type ink-jet recording apparatus.

FIG. 3 is a block diagram illustrating the configuration of the line-head-type ink-jet recording apparatus 100. Elements common to those in FIGS. 1 and 2 are designated using the same reference numerals, and descriptions are not redundantly repeated. The ink-jet recording apparatus 100 includes a control unit 20. The control unit 20 is connected to an interface 21, ROM 22, RAM 23, an encoder 24, a motor control circuit 25, a line-head control circuit 26, a voltage control circuit 27, and so forth.

The interface 21 transmits and receives data to and from a host unit (not illustrated), such as a personal computer. The control unit 20 converts an image signal received through the interface 21 into image data by performing variable-magnification processing or gradation processing, as needed. The control unit 20 sends control signals to various control circuits described below. In the case where the meniscus oscillations are performed, the control unit 20 sends control signals to perform the meniscus oscillations to the line-head control circuit 26 in response to the image non-forming period.

For example, the ROM 22 stores a control program used when the line heads 11C to 11K are driven to record an image. The RAM 23 stores the image data that has been subjected to the variable-magnification processing and/or the gradation processing by the control unit 20 in a predetermined region.

The encoder 24 is connected to the belt driving roller 6 configured to drive the conveying belt 5 and sends a pulse train in response to the amount of rotational displacement of a rotating shaft of the belt driving roller 6. The control unit 20 counts the number of pulses sent from the encoder 24 and calculate the amount of rotation of the belt driving roller 6 to determine the amount of feed of the recording paper P (position of the paper). The control unit 20 sends control signals to the motor control circuit 25 and the line-head control circuit 26 on the basis of signals from the encoder 24.

The motor control circuit 25 drives a recording medium conveying motor 28 based on the output signal from the control unit 20. That is, the motor control circuit 25 drives the recording medium conveying motor 28 to rotate the belt driving roller 6. The rotation of the belt driving roller 6 rotates the conveying belt 5 in a clockwise direction in FIG. 1 to convey the recording paper P in the direction indicated by the arrow X in FIG. 1.

The line-head control circuit 26 transmits image data stored in the RAM 23 to the line heads 11C to 11K based on the output signal from the control unit 20 and controls the ejection of the inks from the line heads 11C to 11K based on the transmitted image data. Recording processing on the recording paper P is performed by this control and the control of the conveyance of the recording paper P by the conveying belt 5 driven by the recording medium conveying motor 28. In the case where the meniscus oscillations are performed, the line-head control circuit 26 controls the meniscus oscillations of the line heads 11C to 11K based on the output signals from the control unit 20.

The voltage control circuit 27 applies a voltage to the belt roller 7 based on the output signal from the control unit 20 to generate an alternating electric field, thereby allowing the recording paper P to be electrostatically adsorbed on the conveying belt 5. The electrostatic adsorption is released by grounding the belt roller 7 or the belt driving roller 6 based on an output signal from the control unit 20. Here, the voltage is applied to the belt roller 7. Alternatively, a voltage may be applied to the belt driving roller 6.

A method for forming dots with the line-head-type ink-jet recording apparatus will be specifically described below with reference to FIG. 4. Among the line heads 11C to 11K illustrated in FIGS. 1 and 2, the line head 11C is described as an example in FIG. 4. The same is true for the line heads 11M to 11K.

Figure 4:
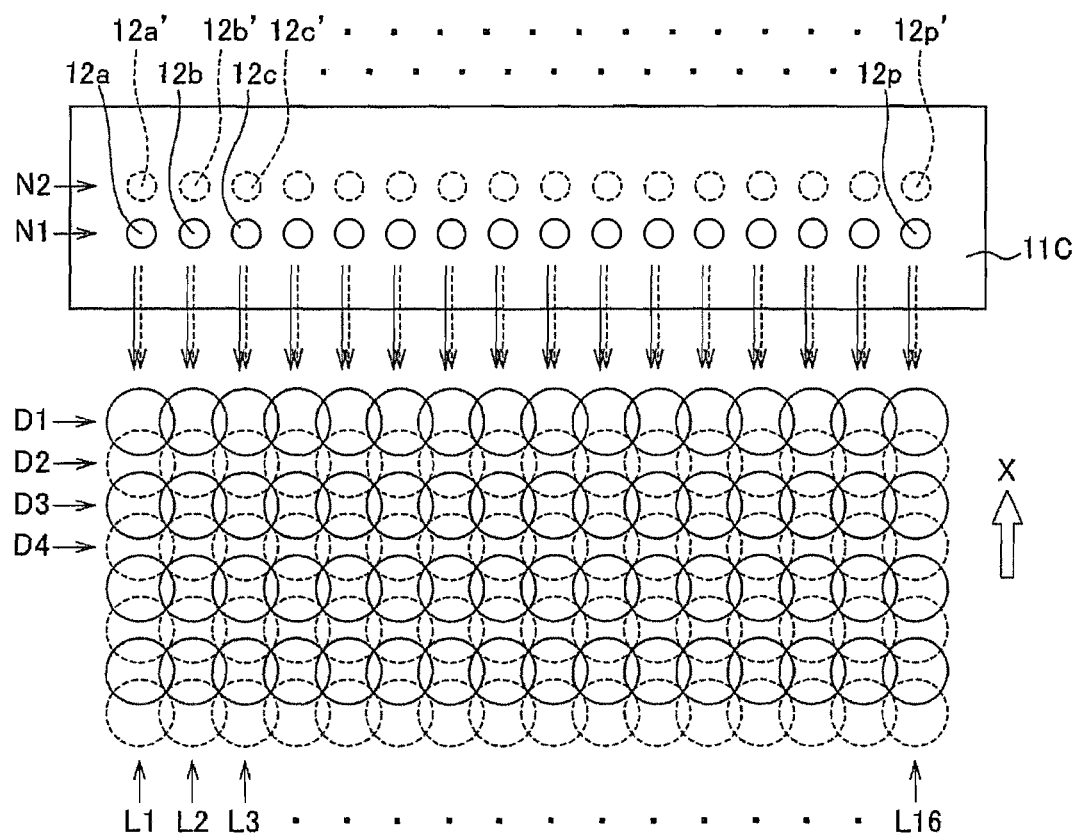
FIG. 4 is an enlarged plan view illustrating a line head for use in the line-head-type ink-jet recording apparatus and some dot rows formed on recording paper.

As illustrated in FIG. 4, in the line head 11C, nozzle rows N1 and N2 each including a plurality of nozzles are juxtaposed to each other in the conveying direction of the recording paper P (in the direction indicated by the arrow X). Specifically, one nozzle for each of the nozzle rows N1 and N2 (for example, nozzles 12a and 12a' in a dot row L1), i.e., a total of two nozzles, serves as nozzles configured to form each dot row in the conveying direction of the recording paper P. For the sake of convenience of description, among nozzles constituting the nozzle rows N1 and N2, only 16 nozzles for each of the nozzle rows, namely, nozzles 12a to 12p and nozzles 12a' to 12p' corresponding to dot lines L1 to L16, are illustrated. In fact, however, a larger number of nozzles are positioned in a direction orthogonal to the conveying direction of the recording paper P.

An image is formed on the recording paper P by sequentially using the nozzle rows N1 and N2. For example, after a dot row D1 corresponding to one line on the recording paper P in the width direction (horizontal direction in the figure) is formed by the ejection of the ink from the nozzle row N1 (as indicated by solid-line arrows in the figure), a dot row D2 corresponding to next one line is formed by the ejection of the ink from the nozzle row N2 (as indicated by broken-line arrows in the figure), while the recording paper P is fed in the conveying direction. Then a dot row D3 corresponding to next one line is formed by the ejection of the ink from the nozzle row N1 again. Thereafter, a dot row D4 and subsequent dot rows are also formed in the same way as above by alternately using the nozzle rows N1 and N2.

In the method for forming an image according to the embodiment described above, the ink according to the previous embodiment is used. It is thus possible to reduce the failure to eject the inks after the inks are not ejected from the recording head for some time and reduce a change in the viscosity of the inks even if the inks are exposed to a high-temperature environment.

EXAMPLES

While the present disclosure will be more specifically described below by examples, the present disclosure is not limited to these examples.

Production of Styrene-Acrylic Resin

A styrene-acrylic resins used for the preparation of a pigment dispersion were produced by a macromonomer synthesis method. Specifically, styrene-acrylic resins 1 to 6 were produced by the copolymerization of a comonomer and an oligomer (AS-6, manufactured by Toagosei Co., Ltd., number-average molecular weight (Mn): 6,000), in which a (meth)acryloyl group is bonded to a molecular end of polystyrene, in methyl ethyl ketone in the presence of a polymerization initiator under different polymerization conditions. The weight-average molecular weight (Mw) of each of the resulting resins was determined by gel permeation chromatography. Table 1 illustrates the weight-average molecular weights of resins 1 to 6. The acid values of resins 1 to 6 were determined by titration and found to be in the range of 30 mgKOH to 60 mgKOH.

TABLE 1

| | Weight-average molecular weight |
|---|---|
| Resin 1 | 10000 |
| Resin 2 | 30000 |
| Resin 3 | 50000 |
| Resin 4 | 100000 |
| Resin 5 | 150000 |
| Resin 6 | 200000 |

Preparation of Pigment Dispersion

Combinations of compositions A to F of pigment dispersions described in Table 2 and resins 1 to 6 provided a total of 36 pigment dispersions. The amount of water was determined in such a manner that when the proportion of each pigment dispersion was 40% by mass with respect to the total mass of the ink, the proportion of each resin with respect to the total mass of the ink was a value described in Table 2.

Specifically, water, a pigment, and a styrene-acrylic resin were charged into a NANO GRAIN MILL (manufactured by Asada Iron Works Co., Ltd.) in proportions described in Table 2. Zirconia beads each having a diameter of 0.5 mm were charged as media into the NANO GRAIN MILL. The pigment was dispersed under cooling with water to provide a pigment dispersion. The resulting pigment dispersion was diluted 300 times with deionized water. The volume-average particle size D50 of the pigment was measured with a dynamic light scattering particle size distribution analyzer (Model: Zetasizer Nano, manufactured by Sysmex Corp.) and found to be in the range of 70 nm or more and 150 nm or less.

TABLE 2

| | Water (% by mass) | Pigment (% by mass) | Resin (% by mass) | Content of resin in ink (% by mass) |
|---|---|---|---|---|
| A | 77.50 | 20 | 2.50 | 1.0 |
| B | 76.25 | 20 | 3.75 | 1.5 |
| C | 75.00 | 20 | 5.00 | 2.0 |
| D | 70.00 | 20 | 10.00 | 4.0 |
| E | 65.00 | 20 | 15.00 | 6.0 |
| F | 64.00 | 20 | 16.00 | 6.4 |

Examples 1 to 16 and Comparative Examples 1 to 56

Preparation of Ink

A total of 432 inks according to Examples 1 to 16 and Comparative Examples 1 to 56 were prepared with the resulting 36 pigment dispersions so as to satisfy ink compositions A to L in which proportions of glycerol and 1,3-propanediol in each ink with respect to the total mass of a corresponding one of the inks were values described in Tables 3 and 4. In Table 3, the amounts of glycerol and 1,3-propanediol are expressed as values (% by mass) with respect to the total mass of the corresponding ink. In the table, Gly represents glycerol, and 1,3-PG represents 1,3-propanediol.

Specifically, 40% by mass of the pigment dispersion, 1% by mass of a surfactant (Olfine E1010, ethylene oxide adduct of acetylene diol, manufactured by Nissin Chemical Industry Co., Ltd.), 1% by mass of 1,2-hexanediol (organic solvent), 5% by mass of triethylene glycol monobutyl ether (organic solvent), 8% by mass of 2-pyrrolidone (dissolution stabilizer), glycerol and 1,3-propanediol in amounts described in Tables 3 and 4, and water were mixed to form a 100% by mass of a composition. The composition was uniformly mixed using a stirrer and then filtered through a filter with a pore size of 5 μm. Thereby, the inks according to Examples 1 to 16 and Comparative Examples 1 to 56 were prepared.

TABLE 3

| | A | B | C | D | E | F |
|---|---|---|---|---|---|---|
| Glycerol (% by mass) | 7.5 | 3.0 | 15.0 | 6.0 | 20.0 | 8.0 |
| 1,3-Propanediol (% by mass) | 7.5 | 12.0 | 15.0 | 24.0 | 20.0 | 32.0 |
| Total mass (Gly + 1,3-PG) (% by mass) | 15 | 15 | 30 | 30 | 40 | 40 |
| Ratio (Gly/1,3-PG) | 1.00 | 0.25 | 1.00 | 0.25 | 1.00 | 0.25 |

TABLE 4

| | G | H | I | J | K | L |
|---|---|---|---|---|---|---|
| Glycerol (% by mass) | 5.0 | 3.0 | 18.0 | 4.0 | 20.0 | 12.0 |
| 1,3-Propanediol (% by mass) | 7.0 | 9.0 | 12.0 | 26.0 | 25.0 | 33.0 |
| Total mass (Gly + 1,3-PG) (% by mass) | 12 | 12 | 30 | 30 | 45 | 45 |
| Ratio (Gly/1,3-PG) | 0.71 | 0.33 | 1.50 | 0.15 | 0.80 | 0.36 |

Evaluation

Intermittent ejectability, storage stability, and resolubility of the 432 inks were measured according to the methods described below. Tables 5 and 6 illustrate the evaluation results of the intermittent ejectability. Tables 7 and 8 illustrate the evaluation results of the storage stability. Tables 9 and 10 illustrate the evaluation results of the resolubility.

Method for Evaluating Intermittent Ejectability

The intermittent ejectability serves as an index of the possibility of the occurrence of the failure to eject when an image is formed after an ink is not ejected from a recording head for some time. The evaluation of the intermittent ejectability was performed as follows: An image forming apparatus including a recording head was used, the recording head including a heater capable of heating the inside of the head, in which the temperature inside the head was detectable. The temperature of the head was maintained at 25° C. The evaluation was performed under environmental conditions of 10° C. and 15% RH. Glossy paper (gloss photo paper KA4100PGP, manufactured by Seiko Epson Corporation) was used as a recording medium. Specifically, line image 1 was formed by printing in the longitudinal direction of the head. After a random non-printed area was formed, line image 2 was formed by printing. The printed state of line image 2 was observed with a microscope to evaluate the intermittent ejectability. The evaluation criteria of the intermittent ejectability are described below.

A: Line image 2 is not disturbed even when the non-printed area having a length exceeding a length corresponding to the long side of A3 size paper is provided between line image 1 and line image 2.

B: Line image is not disturbed as long as the length of the non-printed area is comparable to the length of the long side of A3 size paper from line image 1.

C: Line image is disturbed within the length of the non-printed area is comparable to the length of the long side of A3 size paper from line image 1.

Method for Evaluating Storage Stability

The storage stability serves as an index of the magnitude of a change in the viscosity of an ink after the ink is exposed to a high-temperature environment. About 30 g of the ink having an initial viscosity $V^1$ was charged into a 50-mL vessel. The vessel containing the ink was placed in a thermostatic chamber having an internal temperature of 60° C. and allowed to stand for one month. After the vessel was allowed to stand at room temperature for 3 hours, the viscosity $V^2$ of the ink in the vessel after the storage was measured. The rate of change in viscosity was determined by the equation below using the initial viscosity $V^1$ and the viscosity $V^2$ after the storage. From the results, the evaluation of the storage stability was made according to evaluation criteria described below. The viscosity of the ink was measured with an oscillational viscometer (VM-200T, manufactured by Nittetsu Hokkaido Control Systems Co., Ltd).

Rate of change in viscosity (%)=(($V^1-V^2$)/$V^1$)×100

A: The rate of change in viscosity is less than ±2%.

B: The rate of change in viscosity is in the range of ±2% or more and ±5% or less.

C: The rate of change in viscosity exceeds ±5%.

Method for Evaluating Resolubility

The resolubility serves as an index of whether an ink can be normally ejected or not by performing a maintenance operation before an image is formed after the ink is not ejected from a recording head for some time. For example, in the case where the resolubility is 50% or more, after the ink is allowed to stand for about two weeks under a low-temperature and low-humidity environment or a high-temperature and low-humidity environment without capping the recording head, routine maintenance is performed to enable the ink to be normally ejected. Here, the routine maintenance indicates that the ink is purged at a pressure of 100 kPa to 200 kPa to push a portion of the ink with an increased viscosity out of the nozzle of the recording head and that the portion of the ink that has been pushed out is scraped off with a rubber wipe.

In a petri dish (diameter: 50 mm), whose mass was measured in advance, 5 g of an ink was placed. The ink was dried in a thermostatic chamber at 60° C. until the mass corresponding to water contained in 5 g of the ink was reduced. The mass $W^1$ of the dry ink in the petri dish was measured. Next, 5 g of an undried ink was added to the petri dish after the drying. The petri dish was allowed to stand on a horizontal stage for 30 minutes. After the petri dish was tilted in such a manner that an angle defined by the bottom surface of the petri dish and the horizontal surface of the stage was 135°, the petri dish was vertically elevated upward and kept still for 20 seconds to drop the ink from the petri dish. The mass $W^2$ of the ink left in the petri dish after the dropping of the ink was measured. The resolubility of the ink was calculated from a calculation formula described below using the mass $W^1$ and mass $W^2$ of the ink. Note that the value of "0.3 (g)" in the calculation formula indicates the average mass of the ink adhering to the petri dish when 5 g of the undried ink is dropped from the petri dish until the drop of ink droplets is stopped.

Calculation Formula for Resolubility

Resolubility (%)=(1-($W^2$-0.3)/$W^1$)×100

A: A resolubility of more than 50%.

B: A resolubility of 20% or more and 50% or less.

C: A resolubility of less than 20%.

TABLE 5

| Pigment dispersion | Resin | | Ink composition | | | | | |
|---|---|---|---|---|---|---|---|---|
| | | | A | B | C | D | E | F |
| A | 1 | Comparative Example 1 | B | A | A | A | A | A |
| | 2 | Comparative Example 2 | B | A | B | A | A | A |
| | 3 | Comparative Example 3 | B | A | B | B | B | A |
| | 4 | Comparative Example 4 | B | B | B | B | B | B |
| | 5 | Comparative Example 5 | B | B | B | B | B | B |
| | 6 | Comparative Example 6 | C | C | C | C | C | C |
| B | 1 | Comparative Example 7 | B | A | A | A | A | A |
| | 2 | Example 1 | B | B | B | A | A | A |
| | 3 | Example 2 | B | B | B | B | B | B |
| | 4 | Example 3 | B | B | B | B | B | B |
| | 5 | Example 4 | B | B | B | B | B | B |
| | 6 | Comparative Example 8 | C | C | C | C | C | C |
| C | 1 | Comparative Example 9 | B | B | B | A | A | A |
| | 2 | Example 5 | B | B | B | B | B | A |
| | 3 | Example 6 | B | B | B | B | B | B |
| | 4 | Example 7 | B | B | B | B | B | B |
| | 5 | Example 8 | B | B | B | B | B | B |
| | 6 | Comparative Example 10 | C | C | C | C | C | C |
| D | 1 | Comparative Example 11 | B | B | B | B | B | A |
| | 2 | Example 9 | B | B | B | B | B | B |
| | 3 | Example 10 | B | B | B | B | B | B |
| | 4 | Example 11 | B | B | B | B | B | B |
| | 5 | Example 12 | B | B | B | B | B | B |
| | 6 | Comparative Example 12 | C | C | C | C | C | C |
| E | 1 | Comparative Example 13 | B | B | B | B | B | B |
| | 2 | Example 13 | B | B | B | B | B | B |
| | 3 | Example 14 | B | B | B | B | B | B |
| | 4 | Example 15 | B | B | B | B | B | B |
| | 5 | Example 16 | B | B | B | B | B | B |
| | 6 | Comparative Example 14 | C | C | C | C | C | C |
| F | 1 | Comparative Example 15 | C | C | C | C | C | C |
| | 2 | Comparative Example 16 | C | C | C | C | C | C |
| | 3 | Comparative Example 17 | C | C | C | C | C | C |
| | 4 | Comparative Example 18 | C | C | C | C | C | C |
| | 5 | Comparative Example 19 | C | C | C | C | C | C |
| | 6 | Comparative Example 20 | C | C | C | C | C | C |

TABLE 6

| Pigment dispersion | Resin | Ink composition | G | H | I | J | K | L |
|---|---|---|---|---|---|---|---|---|
| A | 1 | Comparative Example 21 | C | C | C | A | C | C |
| | 2 | Comparative Example 22 | C | C | C | A | C | C |
| | 3 | Comparative Example 23 | C | C | C | A | C | C |
| | 4 | Comparative Example 24 | C | C | C | A | C | C |
| | 5 | Comparative Example 25 | C | C | C | B | C | C |
| | 6 | Comparative Example 26 | C | C | C | C | C | C |
| B | 1 | Comparative Example 27 | C | C | C | A | C | C |
| | 2 | Comparative Example 28 | C | C | C | A | C | C |
| | 3 | Comparative Example 29 | C | C | C | A | C | C |
| | 4 | Comparative Example 30 | C | C | C | A | C | C |
| | 5 | Comparative Example 31 | C | C | C | B | C | C |
| | 6 | Comparative Example 32 | C | C | C | C | C | C |
| C | 1 | Comparative Example 33 | C | C | C | A | C | C |
| | 2 | Comparative Example 34 | C | C | C | A | C | C |
| | 3 | Comparative Example 35 | C | C | C | B | C | C |
| | 4 | Comparative Example 36 | C | C | C | B | C | C |
| | 5 | Comparative Example 37 | C | C | C | B | C | C |
| | 6 | Comparative Example 38 | C | C | C | C | C | C |
| D | 1 | Comparative Example 39 | C | C | C | A | C | C |
| | 2 | Comparative Example 40 | C | C | C | B | C | C |
| | 3 | Comparative Example 41 | C | C | C | B | C | C |
| | 4 | Comparative Example 42 | C | C | C | B | C | C |
| | 5 | Comparative Example 43 | C | C | C | B | C | C |
| | 6 | Comparative Example 44 | C | C | C | C | C | C |
| E | 1 | Comparative Example 45 | C | C | C | A | C | C |
| | 2 | Comparative Example 46 | C | C | C | B | C | C |
| | 3 | Comparative Example 47 | C | C | C | B | C | C |
| | 4 | Comparative Example 48 | C | C | C | B | C | C |
| | 5 | Comparative Example 49 | C | C | C | C | C | C |
| | 6 | Comparative Example 50 | C | C | C | C | C | C |
| F | 1 | Comparative Example 51 | C | C | C | C | C | C |
| | 2 | Comparative Example 52 | C | C | C | C | C | C |
| | 3 | Comparative Example 53 | C | C | C | C | C | C |
| | 4 | Comparative Example 54 | C | C | C | C | C | C |
| | 5 | Comparative Example 55 | C | C | C | C | C | C |
| | 6 | Comparative Example 56 | C | C | C | C | C | C |

As is clear from Tables 5 and 6, when using inks containing a resin having a weight-average molecular weight of more than 150,000 (inks containing resin 6) and using inks in which the content of the resin is more than 6.0% by mass with respect to the total mass of each ink (each ink using pigment dispersion F), the viscosity of the inks is liable to be high. Thus, when an image is formed after the ink is not ejected from the recording head for some time, it is difficult to reduce the failure to eject the ink.

When using inks (ink G and H) in which the total content (P+Q) of the content of the glycerol (P) and the content of the 1,3-propanediol (Q) is less than 15% by mass, the solvent of the inks is easily evaporated. Furthermore, the evaporation of the solvent is liable to cause an increase in the viscosity of the inks. Thus, when an image is formed after the ink is not ejected from the recording head for some time, it is difficult to reduce the failure to eject the ink. Meanwhile, when using inks (ink K and L) in which a total content (P+Q) is more than 40% by mass, the evaporation of the solvent can be reduced. However, the viscosity of the ink is liable to be high, compared with the case of a small amount of the humectant. Thus, when an image is formed after the ink is not ejected from the recording head for some time, it is difficult to reduce the failure to eject the ink.

When using inks (ink I) in which the mass ratio (P/Q) of the content of the glycerol (P) to the content of the 1,3-propanediol (Q) is more than 1.00, the viscosity of the ink is liable to be high because the content of the glycerol (P) is relatively high. Thus, when an image is formed after the ink is not ejected from the recording head for some time, it is difficult to reduce the failure to eject the ink.

TABLE 7

| Pigment dispersion | Resin | Ink composition | A | B | C | D | E | F |
|---|---|---|---|---|---|---|---|---|
| A | 1 | Comparative Example 1 | C | C | C | C | C | C |
| | 2 | Comparative Example 2 | C | C | C | C | C | C |
| | 3 | Comparative Example 3 | C | C | C | C | C | C |
| | 4 | Comparative Example 4 | C | C | C | C | C | C |
| | 5 | Comparative Example 5 | C | C | C | C | C | C |
| | 6 | Comparative Example 6 | C | C | C | C | C | C |
| B | 1 | Comparative Example 7 | C | C | C | C | C | C |
| | 2 | Example 1 | B | B | B | B | B | B |
| | 3 | Example 2 | B | B | B | B | B | B |
| | 4 | Example 3 | B | B | B | B | B | B |
| | 5 | Example 4 | B | B | B | B | B | B |
| | 6 | Comparative Example 8 | B | B | B | B | B | B |
| C | 1 | Comparative Example 9 | C | C | C | C | C | C |
| | 2 | Example 5 | B | B | B | B | B | B |
| | 3 | Example 6 | B | B | B | B | B | B |
| | 4 | Example 7 | B | B | B | B | B | B |
| | 5 | Example 8 | B | B | B | B | B | B |
| | 6 | Comparative Example 10 | A | A | A | A | A | A |
| D | 1 | Comparative Example 11 | C | C | C | C | C | C |
| | 2 | Example 9 | B | B | B | B | B | B |
| | 3 | Example 10 | B | B | B | B | B | B |
| | 4 | Example 11 | B | B | B | B | B | B |
| | 5 | Example 12 | A | A | A | A | A | A |
| | 6 | Comparative Example 12 | A | A | A | A | A | A |
| E | 1 | Comparative Example 13 | C | C | C | C | C | C |
| | 2 | Example 13 | B | B | B | B | B | B |
| | 3 | Example 14 | B | B | B | B | B | B |
| | 4 | Example 15 | A | A | A | A | A | A |
| | 5 | Example 16 | A | A | A | A | A | A |
| | 6 | Comparative Example 14 | A | A | A | A | A | A |
| F | 1 | Comparative Example 15 | C | C | C | C | C | C |
| | 2 | Comparative Example 16 | B | B | B | B | B | B |
| | 3 | Comparative Example 17 | B | B | B | B | B | B |
| | 4 | Comparative Example 18 | A | A | A | A | A | A |
| | 5 | Comparative Example 19 | A | A | A | A | A | A |
| | 6 | Comparative Example 20 | A | A | A | A | A | A |

TABLE 8

| Pigment dispersion | Resin | Ink composition | G | H | I | J | K | L |
|---|---|---|---|---|---|---|---|---|
| A | 1 | Comparative Example 21 | C | C | C | C | C | C |
| | 2 | Comparative Example 22 | C | C | C | C | C | C |
| | 3 | Comparative Example 23 | C | C | C | C | C | C |
| | 4 | Comparative Example 24 | C | C | C | C | C | C |
| | 5 | Comparative Example 25 | C | C | C | C | C | C |
| | 6 | Comparative Example 26 | C | C | C | C | C | C |
| B | 1 | Comparative Example 27 | C | C | C | C | C | C |
| | 2 | Comparative Example 28 | C | C | B | B | B | B |
| | 3 | Comparative Example 29 | C | C | B | B | B | B |
| | 4 | Comparative Example 30 | C | C | B | B | B | B |
| | 5 | Comparative Example 31 | C | C | B | B | B | B |
| | 6 | Comparative Example 32 | C | C | B | B | B | B |
| C | 1 | Comparative Example 33 | C | C | C | C | C | C |
| | 2 | Comparative Example 34 | C | C | B | B | B | B |
| | 3 | Comparative Example 35 | C | C | B | B | B | B |
| | 4 | Comparative Example 36 | C | C | B | B | B | B |
| | 5 | Comparative Example 37 | C | C | B | B | B | B |
| | 6 | Comparative Example 38 | C | C | A | A | A | A |
| D | 1 | Comparative Example 39 | C | C | C | C | C | C |
| | 2 | Comparative Example 40 | C | C | B | B | B | B |
| | 3 | Comparative Example 41 | C | C | B | B | B | B |
| | 4 | Comparative Example 42 | C | C | B | B | B | B |
| | 5 | Comparative Example 43 | C | C | A | A | A | A |
| | 6 | Comparative Example 44 | C | C | A | A | A | A |
| E | 1 | Comparative Example 45 | C | C | C | C | C | C |
| | 2 | Comparative Example 46 | C | C | B | B | B | B |
| | 3 | Comparative Example 47 | C | C | B | B | B | B |
| | 4 | Comparative Example 48 | C | C | A | A | A | A |
| | 5 | Comparative Example 49 | C | C | A | A | A | A |
| | 6 | Comparative Example 50 | C | C | A | A | A | A |

TABLE 8-continued

| Pigment dispersion | Resin | | Ink composition | | | | | |
|---|---|---|---|---|---|---|---|---|
| | | | G | H | I | J | K | L |
| F | 1 | Comparative Example 51 | C | C | C | C | C | C |
| | 2 | Comparative Example 52 | C | C | B | B | B | B |
| | 3 | Comparative Example 53 | C | C | B | B | B | B |
| | 4 | Comparative Example 54 | C | C | A | A | A | A |
| | 5 | Comparative Example 55 | C | C | A | A | A | A |
| | 6 | Comparative Example 56 | C | C | A | A | A | A |

As is clear from Tables 7 and 8, when using inks containing resin having a weight-average molecular weight of less than 30,000 (inks containing resin 1) and using inks in which the content of resin is less than 1.5% by mass with respect to the total mass of each ink (each ink using pigment dispersion A), it is difficult to reduce a change in the viscosity of the ink when the ink is exposed to a high-temperature environment for prolonged periods of time.

When using inks (ink G and H) in which the total content (P+Q) of the content of the glycerol (P) and the content of the 1,3-propanediol (Q) is less than 15% by mass, the solvent of the ink is easily evaporated. It is thus difficult to reduce a change in the viscosity of the ink when the ink is exposed to a high-temperature environment for prolonged periods of time.

TABLE 9

| Pigment dispersion | Resin | | Ink composition | | | | | |
|---|---|---|---|---|---|---|---|---|
| | | | A | B | C | D | E | F |
| A | 1 | Comparative Example 1 | A | A | A | A | A | A |
| | 2 | Comparative Example 2 | A | A | A | A | A | A |
| | 3 | Comparative Example 3 | A | A | A | A | A | A |
| | 4 | Comparative Example 4 | B | B | B | B | B | B |
| | 5 | Comparative Example 5 | B | B | B | B | B | B |
| | 6 | Comparative Example 6 | C | C | C | C | C | C |
| B | 1 | Comparative Example 7 | A | A | A | A | A | A |
| | 2 | Example 1 | A | A | A | A | A | A |
| | 3 | Example 2 | B | B | B | B | B | B |
| | 4 | Example 3 | B | B | B | B | B | B |
| | 5 | Example 4 | B | B | B | B | B | B |
| | 6 | Comparative Example 8 | C | C | C | C | C | C |
| C | 1 | Comparative Example 9 | A | A | A | A | A | A |
| | 2 | Example 5 | A | A | A | A | A | A |
| | 3 | Example 6 | B | B | B | B | B | B |
| | 4 | Example 7 | B | B | B | B | B | B |
| | 5 | Example 8 | B | B | B | B | B | B |
| | 6 | Comparative Example 10 | C | C | C | C | C | C |
| D | 1 | Comparative Example 11 | A | A | A | A | A | A |
| | 2 | Example 9 | B | B | B | B | B | B |
| | 3 | Example 10 | B | B | B | B | B | B |
| | 4 | Example 11 | B | B | B | B | B | B |
| | 5 | Example 12 | B | B | B | B | B | B |
| | 6 | Comparative Example 12 | C | C | C | C | C | C |
| E | 1 | Comparative Example 13 | A | A | A | A | A | A |
| | 2 | Example 13 | B | B | B | B | B | B |
| | 3 | Example 14 | B | B | B | B | B | B |
| | 4 | Example 15 | B | B | B | B | B | B |
| | 5 | Example 16 | B | B | B | B | B | B |
| | 6 | Comparative Example 14 | C | C | C | C | C | C |
| F | 1 | Comparative Example 15 | A | A | A | A | A | A |
| | 2 | Comparative Example 16 | B | B | B | B | B | B |
| | 3 | Comparative Example 17 | B | B | B | B | B | B |
| | 4 | Comparative Example 18 | B | B | B | B | B | B |
| | 5 | Comparative Example 19 | B | B | B | B | B | B |
| | 6 | Comparative Example 20 | C | C | C | C | C | C |

TABLE 10

| Pigment dispersion | Resin | | Ink composition | | | | | |
|---|---|---|---|---|---|---|---|---|
| | | | G | H | I | J | K | L |
| A | 1 | Comparative Example 21 | C | C | A | C | A | C |
| | 2 | Comparative Example 22 | C | C | A | C | A | C |
| | 3 | Comparative Example 23 | C | C | A | C | A | C |
| | 4 | Comparative Example 24 | C | C | A | C | A | C |
| | 5 | Comparative Example 25 | C | C | B | C | B | C |
| | 6 | Comparative Example 26 | C | C | C | C | C | C |
| B | 1 | Comparative Example 27 | C | C | A | C | A | C |
| | 2 | Comparative Example 28 | C | C | A | C | A | C |
| | 3 | Comparative Example 29 | C | C | A | C | A | C |
| | 4 | Comparative Example 30 | C | C | B | C | B | C |
| | 5 | Comparative Example 31 | C | C | B | C | B | C |
| | 6 | Comparative Example 32 | C | C | C | C | C | C |
| C | 1 | Comparative Example 33 | C | C | A | C | A | C |
| | 2 | Comparative Example 34 | C | C | A | C | A | C |
| | 3 | Comparative Example 35 | C | C | A | C | A | C |
| | 4 | Comparative Example 36 | C | C | B | C | B | C |
| | 5 | Comparative Example 37 | C | C | B | C | B | C |
| | 6 | Comparative Example 38 | C | C | C | C | C | C |
| D | 1 | Comparative Example 39 | C | C | A | C | A | C |
| | 2 | Comparative Example 40 | C | C | A | C | A | C |
| | 3 | Comparative Example 41 | C | C | B | C | B | C |
| | 4 | Comparative Example 42 | C | C | B | C | B | C |
| | 5 | Comparative Example 43 | C | C | B | C | B | C |
| | 6 | Comparative Example 44 | C | C | C | C | C | C |
| E | 1 | Comparative Example 45 | C | C | A | C | A | C |
| | 2 | Comparative Example 46 | C | C | A | C | A | C |
| | 3 | Comparative Example 47 | C | C | B | C | B | C |
| | 4 | Comparative Example 48 | C | C | B | C | B | C |
| | 5 | Comparative Example 49 | C | C | B | C | B | C |
| | 6 | Comparative Example 50 | C | C | C | C | C | C |
| F | 1 | Comparative Example 51 | C | C | A | C | A | C |
| | 2 | Comparative Example 52 | C | C | A | C | A | C |
| | 3 | Comparative Example 53 | C | C | B | C | B | C |
| | 4 | Comparative Example 54 | C | C | B | C | B | C |
| | 5 | Comparative Example 55 | C | C | B | C | B | C |
| | 6 | Comparative Example 56 | C | C | C | C | C | C |

As is clear from Tables 9 and 10, when using inks having a weight-average molecular weight of more than 150,000 (inks containing resin 6), it is difficult to reduce the evaporation of the solvent in the ink when the ink is not ejected from the recording head for some time.

When using inks (ink G and H) in which the total content (P+Q) of the content of the glycerol (P) and the content of the 1,3-propanediol (Q) is less than 15% by mass, it is difficult to reduce the evaporation of the solvent in the ink when the ink is not ejected from the recording head for some time.

When using inks (ink J) in which the mass ratio (P/Q) of the content of the glycerol (P) to the content of the 1,3-propanediol (Q) is less than 0.25, it is difficult to reduce the evaporation of the solvent in the ink when the ink is not ejected from the recording head for some time because the content of the glycerol (P) is relatively low.

From the evaluation results of the intermittent ejectability, the storage stability, and the resolubility, a comprehensive evaluation was conducted as follows: the inks rated as A or B in all the evaluations are evaluated as "Pass (P)", and the inks rated as C in any of the evaluations are evaluated as "Fail (F)". Tables 11 and 12 illustrate the comprehensive evaluation.

TABLE 11

| Pigment dispersion | Resin | | Ink composition | | | | | |
|---|---|---|---|---|---|---|---|---|
| | | | A | B | C | D | E | F |
| A | 1 | Comparative Example 1 | F | F | F | F | F | F |
| | 2 | Comparative Example 2 | F | F | F | F | F | F |
| | 3 | Comparative Example 3 | F | F | F | F | F | F |

TABLE 11-continued

| Pigment dispersion | Resin | | Ink composition | | | | | |
|---|---|---|---|---|---|---|---|---|
| | | | A | B | C | D | E | F |
| | 4 | Comparative Example 4 | F | F | F | F | F | F |
| | 5 | Comparative Example 5 | F | F | F | F | F | F |
| | 6 | Comparative Example 6 | F | F | F | F | F | F |
| B | 1 | Comparative Example 7 | F | F | F | F | F | F |
| | 2 | Example 1 | P | P | P | P | P | P |
| | 3 | Example 2 | P | P | P | P | P | P |
| | 4 | Example 3 | P | P | P | P | P | P |
| | 5 | Example 4 | P | P | P | P | P | P |
| | 6 | Comparative Example 8 | F | F | F | F | F | F |
| C | 1 | Comparative Example 9 | F | F | F | F | F | F |
| | 2 | Example 5 | P | P | P | P | P | P |
| | 3 | Example 6 | P | P | P | P | P | P |
| | 4 | Example 7 | P | P | P | P | P | P |
| | 5 | Example 8 | P | P | P | P | P | P |
| | 6 | Comparative Example 10 | F | F | F | F | F | F |
| D | 1 | Comparative Example 11 | F | F | F | F | F | F |
| | 2 | Example 9 | P | P | P | P | P | P |
| | 3 | Example 10 | P | P | P | P | P | P |
| | 4 | Example 11 | P | P | P | P | P | P |
| | 5 | Example 12 | P | P | P | P | P | P |
| | 6 | Comparative Example 12 | F | F | F | F | F | F |
| E | 1 | Comparative Example 13 | F | F | F | F | F | F |
| | 2 | Example 13 | P | P | P | P | P | P |
| | 3 | Example 14 | P | P | P | P | P | P |
| | 4 | Example 15 | P | P | P | P | P | P |
| | 5 | Example 16 | P | P | P | P | P | P |
| | 6 | Comparative Example 14 | F | F | F | F | F | F |
| F | 1 | Comparative Example 15 | F | F | F | F | F | F |
| | 2 | Comparative Example 16 | F | F | F | F | F | F |
| | 3 | Comparative Example 17 | F | F | F | F | F | F |
| | 4 | Comparative Example 18 | F | F | F | F | F | F |
| | 5 | Comparative Example 19 | F | F | F | F | F | F |
| | 6 | Comparative Example 20 | F | F | F | F | F | F |

TABLE 12

| Pigment dispersion | Resin | | Ink composition | | | | | |
|---|---|---|---|---|---|---|---|---|
| | | | G | H | I | J | K | L |
| A | 1 | Comparative Example 21 | F | F | F | F | F | F |
| | 2 | Comparative Example 22 | F | F | F | F | F | F |
| | 3 | Comparative Example 23 | F | F | F | F | F | F |
| | 4 | Comparative Example 24 | F | F | F | F | F | F |
| | 5 | Comparative Example 25 | F | F | F | F | F | F |
| | 6 | Comparative Example 26 | F | F | F | F | F | F |
| B | 1 | Comparative Example 27 | F | F | F | F | F | F |
| | 2 | Comparative Example 28 | F | F | F | F | F | F |
| | 3 | Comparative Example 29 | F | F | F | F | F | F |
| | 4 | Comparative Example 30 | F | F | F | F | F | F |
| | 5 | Comparative Example 31 | F | F | F | F | F | F |
| | 6 | Comparative Example 32 | F | F | F | F | F | F |
| C | 1 | Comparative Example 33 | F | F | F | F | F | F |
| | 2 | Comparative Example 34 | F | F | F | F | F | F |
| | 3 | Comparative Example 35 | F | F | F | F | F | F |
| | 4 | Comparative Example 36 | F | F | F | F | F | F |
| | 5 | Comparative Example 37 | F | F | F | F | F | F |
| | 6 | Comparative Example 38 | F | F | F | F | F | F |
| D | 1 | Comparative Example 39 | F | F | F | F | F | F |
| | 2 | Comparative Example 40 | F | F | F | F | F | F |
| | 3 | Comparative Example 41 | F | F | F | F | F | F |
| | 4 | Comparative Example 42 | F | F | F | F | F | F |
| | 5 | Comparative Example 43 | F | F | F | F | F | F |
| | 6 | Comparative Example 44 | F | F | F | F | F | F |
| E | 1 | Comparative Example 45 | F | F | F | F | F | F |
| | 2 | Comparative Example 46 | F | F | F | F | F | F |
| | 3 | Comparative Example 47 | F | F | F | F | F | F |
| | 4 | Comparative Example 48 | F | F | F | F | F | F |
| | 5 | Comparative Example 49 | F | F | F | F | F | F |
| | 6 | Comparative Example 50 | F | F | F | F | F | F |
| F | 1 | Comparative Example 51 | F | F | F | F | F | F |
| | 2 | Comparative Example 52 | F | F | F | F | F | F |
| | 3 | Comparative Example 53 | F | F | F | F | F | F |

TABLE 12-continued

| Pigment dispersion | Resin | | Ink composition | | | | | |
|---|---|---|---|---|---|---|---|---|
| | | | G | H | I | J | K | L |
| | 4 | Comparative Example 54 | F | F | F | F | F | F |
| | 5 | Comparative Example 55 | F | F | F | F | F | F |
| | 6 | Comparative Example 56 | F | F | F | F | F | F |

As is clear from Tables 11 and 12, where the inks contain water, the pigment, the resin, the humectant, and the organic solvent, the resin having a weight-average molecular weight of 30,000 to 150,000 (resins 2 to 6), the content of the resin in each ink being 1.5% to 6.0% by mass with respect to the mass of the inks (pigment dispersions B to E), the humectant containing glycerol and 1,3-propanediol, the total content (P+Q) of the content of the glycerol (P) and the content of the 1,3-propanediol (Q) in the inks being 15% to 40% by mass with respect to the mass of the inks, and the mass ratio (P/Q) being 0.25 to 1.00 (inks A to F), it is possible to reduce the evaporation of the solvent in the inks when the inks are not ejected from the recording head for some time and reduce the failure to eject the inks when an image is formed after the inks are not ejected for some time. Furthermore, it is possible to reduce a change in the viscosity of the inks even when the inks is exposed to a high-temperature environment.

Reference Example

A total of 48 inks according to Examples 17 to 20 and Comparative Examples 57 to 60 were prepared, each of the inks containing resin 4 and the pigment dispersion with a composition according to composition D described in Table 2, except that organic solvents described in items (1) to (4) were used in place of 1.0% by mass of 1,2-hexanediol serving as an organic solvent.
 (1) 1.0% by mass of 1,2-octanediol
 (2) 2.0% by mass of 2-ethyl-1,3-hexanediol
 (3) 2.0% by mass of 2,4-diethyl-1,5-pentanediol
 (4) 1.0% by mass of 2-butyl-2-ethyl-1,3-propanediol Specifically, the inks according to Examples 17 to 20 and Comparative Examples 57 to 60 were prepared as in Examples 1 to 16 and Comparative Examples 1 to 56, the inks having ink compositions A to L in which the proportions of glycerol and 1,3-propanediol with respect to the total mass of each ink are described in Tables 3 and 4, except that the organic solvents described in items (1) to (4) were used in place of 1.0% by mass of 1,2-hexanediol serving as an organic solvent. For Examples 17 to 20 and Comparative Examples 57 to 60, Tables 13 and 14 illustrates the evaluations of the intermittent ejectability, the storage stability, and the resolubility of the inks containing the organic solvents described in items (1) to (4).

TABLE 13

| Organic solvent | | Evaluation | Ink composition | | | | | |
|---|---|---|---|---|---|---|---|---|
| | | | A | B | C | D | E | F |
| 1 | Example 17 | Intermittent ejectability | P | P | P | P | P | P |
| | | Storage stability | P | P | P | P | P | P |
| | | Resolubility | P | P | P | P | P | P |
| 2 | Example 18 | Intermittent ejectability | P | P | P | P | P | P |
| | | Storage stability | P | P | P | P | P | P |
| | | Resolubility | P | P | P | P | P | P |

TABLE 13-continued

| Organic solvent | | Evaluation | Ink composition | | | | | |
|---|---|---|---|---|---|---|---|---|
| | | | A | B | C | D | E | F |
| 3 | Example 19 | Intermittent ejectability | P | P | P | P | P | P |
| | | Storage stability | P | P | P | P | P | P |
| | | Resolubility | P | P | P | P | P | P |
| 4 | Example 20 | Intermittent ejectability | P | P | P | P | P | P |
| | | Storage stability | P | P | P | P | P | P |
| | | Resolubility | P | P | P | P | P | P |

TABLE 14

| Organic solvent | | Evaluation | Ink composition | | | | | |
|---|---|---|---|---|---|---|---|---|
| | | | G | H | I | J | K | L |
| 1 | Comparative Example 57 | Intermittent ejectability | F | F | F | P | F | F |
| | | Storage stability | F | F | P | P | P | P |
| | | Resolubility | F | F | P | F | P | F |
| 2 | Comparative Example 58 | Intermittent ejectability | F | F | F | P | F | F |
| | | Storage stability | F | F | P | P | P | P |
| | | Resolubility | F | F | P | F | P | F |
| 3 | Comparative Example 59 | Intermittent ejectability | F | F | F | P | F | F |
| | | Storage stability | F | F | P | P | P | P |
| | | Resolubility | F | F | P | F | P | F |
| 4 | Comparative Example 60 | Intermittent ejectability | F | F | F | P | F | F |
| | | Storage stability | F | F | P | P | P | P |
| | | Resolubility | F | F | P | F | P | F |

As is clear from Table 13, even if 1,2-octanediol, 2-ethyl-1,3-hexanediol, 2,4-diethyl-1,5-pentanediol, or 2-butyl-2-ethyl-1,3-propanediol is contained in each ink in place of 1,2-hexanediol serving as an organic solvent, when the inks contain water, the pigment, the resin, the humectant, and the organic solvent, the resin having a weight-average molecular weight of 30,000 to 150,000 (resins 2 to 6), the content of the resin in each ink being 1.5% to 6.0% by mass with respect to the mass of the ink (pigment dispersions B to E), the humectant containing glycerol and 1,3-propanediol, the total content (P+Q) of the content of the glycerol (P) and the content of the 1,3-propanediol (Q) in the ink being 15% to 40% by mass with respect to the mass of the ink, and the mass ratio (P/Q) being 0.25 to 1.00 (inks A to F), it is possible to reduce the evaporation of the solvent in the ink when the ink is not ejected from the recording head for some time and reduce the failure to eject the ink when an image is formed after the ink is not ejected for some time. Furthermore, it is possible to reduce a change in the viscosity of the ink even when the ink is exposed to a high-temperature environment.

As is clear from Table 14, when using compositions G to L, even if 1,2-octanediol, 2-ethyl-1,3-hexanediol, 2,4-diethyl-1,5-pentanediol, or 2-butyl-2-ethyl-1,3-propanediol is contained in each ink in place of 1,2-hexanediol serving as an organic solvent, an ink that achieves satisfactory intermittent ejectability, storage stability, and resolubility is not provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An ink for an ink-jet recording apparatus, comprising:
water;
a pigment dispersion including a pigment and a resin;
a humectant; and
an organic solvent,
wherein the resin has a weight-average molecular weight of 30,000 to 150,000,
wherein the content of the resin is 1.5% to 6.0% by mass with respect to the mass of the ink,
wherein the humectant contains glycerol and 1,3-propanediol,
wherein the total content (P+Q) of the content of the glycerol (P) and the content of the 1,3-propanediol (Q) in the ink is 15% to 40% by mass with respect to the mass of the ink,
wherein the mass ratio (P/Q) is 0.25-1.00,
wherein the organic solvent is selected from the group consisting of 1,2-hexanediol, 1,2-octanediol, 2,4-diethyl-1,5-pentanediol, and 2-butyl-2-ethyl-1,3-propanediol,
wherein the content of the organic solvent is 0.1% to 3.0% by mass with respect to the mass of the ink.

2. The ink according to claim 1,
wherein the content of the glycerol is 3.0% to 20.0% by mass with respect to the mass of the ink.

3. The ink according to claim 1,
wherein the content of the 1,3-propanediol is 7.5% to 24.0% by mass with respect to the mass of the ink.

4. A method for forming an image with an ink-jet recording apparatus, comprising:
ejecting an ink to a recording medium to form an image,
wherein the ink contains water, a pigment dispersion including a pigment and a resin, a humectant, and an organic solvent, wherein the resin has a weight-average molecular weight of 30,000 to 150,000, the content of the resin is 1.5% to 6.0% by mass with respect to the mass of the ink, the humectant contains glycerol and 1,3-propanediol, the total content (P+Q) of the content of the glycerol (P) and the content of the 1,3-propanediol (Q) in the ink is 15% to 40% by mass with respect to the mass of the ink, the mass ratio (P/Q) is 0.25 to 1.00, and wherein the organic solvent is selected from the group consisting of 1,2-hexanediol, 1,2-octanediol, 2,4-diethyl- 1,5-pentanediol, and 2-butyl-2-ethyl-1,3-propanediol, and
wherein the content of the organic solvent is 0.1% to 3.0% by mass with respect to the mass of the ink.

5. The method according to claim 4,
wherein the ink-jet recording apparatus includes a recording head configured to eject a droplet of the ink using a pressure created in a liquid chamber by controlling a voltage applied to a piezoelectric element, and
wherein a recording system of the ink-jet recording apparatus is a line-head-type recording system.

6. The method according to claim 5,
wherein the ink is ejected from an orifice of a nozzle included in the recording head,
wherein a control unit included in the ink-jet recording apparatus controls a voltage applied to the piezoelectric element to perform meniscus oscillations in which a plurality of oscillations of a meniscus of the ink formed in the vicinity of the orifice of the nozzle are successively performed to the extent that the ink is not ejected, and
wherein the meniscus oscillations are performed at intervals of 0.3 seconds or more.

7. The method according to claim 4,
wherein the content of the glycerol is 3.0%-20.0% by mass with respect to the mass of the ink.

8. The method according to claim 4,
wherein the content of the 1,3-propanediol is 7.5% to 24.0% by mass with respect to the mass of the ink.

9. A method for forming an image with an ink-jet recording apparatus, comprising:
ejecting an ink to a recording medium to form an image,
wherein the ink contains water, a pigment dispersion including a pigment and a resin, a humectant, and an organic solvent, wherein the resin has a weight-average molecular weight of 30,000 to 150,000, the content of the resin is 1.5% to 6.0% by mass with respect to the mass of the ink, the humectant contains glycerol and 1,3-propanediol, the total content (P+Q) of the content of the glycerol (P) and the content of the 1,3-propanediol (Q) in the ink is 15% to 40% by mass with respect to the mass of the ink, the mass ratio (P/Q) is 0.25 to 1.00, and wherein the organic solvent is selected from the group consisting of 1,2-hexanediol, 1,2-octanediol, 2,4-diethyl-1,5-pentanediol, and 2-butyl-2-ethyl-1,3-propanediol, p1 wherein the ink-jet recording apparatus includes a recording head configured to eject a droplet of the ink using a pressure created in a liquid chamber by controlling a voltage applied to a piezoelectric element,
wherein a recording system of the ink-jet recording apparatus is a line-head-type recording system,
wherein the ink is ejected from an orifice of a nozzle included in the recording head,
wherein a control unit included in the ink-jet recording apparatus controls a voltage applied to the piezoelectric element to perform meniscus oscillations in which a plurality of oscillations of a meniscus of the ink formed in the vicinity of the orifice of the nozzle are successively performed to the extent that the ink is not ejected, and
wherein the meniscus oscillations are performed at intervals of 0.3 seconds or more.

\* \* \* \* \*